(12) United States Patent
Zhang et al.

(10) Patent No.: US 9,237,541 B2
(45) Date of Patent: Jan. 12, 2016

(54) METHODS AND ARRANGEMENTS FOR ESTIMATING TIMING OFFSET DIFFERENCES IN A CELLULAR NETWORK

(75) Inventors: Yang Zhang, Shanghai (CN); Iana Siomina, Solna (SE); Youping Su, Solna (SE); Chunhui Zhang, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 173 days.

(21) Appl. No.: 14/007,539

(22) PCT Filed: Mar. 31, 2011

(86) PCT No.: PCT/CN2011/000556
§ 371 (c)(1),
(2), (4) Date: Sep. 25, 2013

(87) PCT Pub. No.: WO2012/129730
PCT Pub. Date: Oct. 4, 2012

(65) Prior Publication Data
US 2014/0016621 A1    Jan. 16, 2014

(51) Int. Cl.
*H04W 4/00* (2009.01)
*H04W 56/00* (2009.01)
*H04W 64/00* (2009.01)

(52) U.S. Cl.
CPC ...... *H04W 56/0075* (2013.01); *H04W 56/0055* (2013.01); *H04W 64/00* (2013.01)

(58) Field of Classification Search
CPC .............. H04W 24/00–24/10; H04W 56/0075
USPC ........... 455/436–444, 432.1–433, 456.1–457; 370/331–337
See application file for complete search history.

(56) References Cited

U.S. PATENT DOCUMENTS 6,597,916 B2 * 7/2003 Edge .......................... 455/456.1
8,489,098 B2 * 7/2013 Wigren et al. ................ 455/436
(Continued)

FOREIGN PATENT DOCUMENTS

CA      2600700 A1    8/1999
CN    101035379 A     9/2007
(Continued)

OTHER PUBLICATIONS

Borkar, "3G and 4G wireless—Advances and challenges", Apr. 14, 2006.*
(Continued)

*Primary Examiner* — Thai Hoang
(74) *Attorney, Agent, or Firm* — Murphy, Bilak & Homiller, PLLC (57) ABSTRACT

A method in a first network node (105) for estimating a first timing offset difference between a first timing offset of a first base station and a second timing offset of a second base station, is provided. The first network node (105) receives Uplink Time Difference Of Arrival, UTDOA, measurements. The UTDOA measurements relate to a first UTDOA time difference. The first network node (105) further receives Observed Time Difference Of Arrival, OTDOA, measurements. The OTDOA measurements relate to a first measured OTDOA time difference. The first network node estimates a first timing offset difference between a first timing offset of the first base station and a second timing offset of the second base station based on the first UTDOA time difference and the first measured OTDOA time difference.

12 Claims, 8 Drawing Sheets

(56) References Cited

U.S. PATENT DOCUMENTS

| | | | |
|---|---|---|---|
| 2004/0023671 A1* | 2/2004 | Rudolf et al. | 455/456.5 |
| 2008/0085699 A1* | 4/2008 | Hirano et al. | 455/414.2 |
| 2011/0045815 A1* | 2/2011 | Schork et al. | 455/418 |
| 2011/0312355 A1* | 12/2011 | Cheng et al. | 455/501 |
| 2012/0009939 A1* | 1/2012 | Islam et al. | 455/456.1 |
| 2013/0023285 A1* | 1/2013 | Markhovsky et al. | 455/456.1 |
| 2014/0094125 A1* | 4/2014 | Behravan et al. | 455/63.1 |
| 2015/0011233 A1* | 1/2015 | Kazmi et al. | 455/454 |

FOREIGN PATENT DOCUMENTS

| | | |
|---|---|---|
| CN | 101491148 A | 7/2009 |
| CN | 101541078 A | 9/2009 |
| WO | 2004012375 A3 | 4/2004 |
| WO | 2008008685 A2 | 1/2008 |
| WO | 2011016806 A1 | 2/2011 |

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 9)", 3GPP TS 36.355 V9.4.0, Dec. 2010, 1-112.

3GPP, "3rd Generation Partnership Project; Technical Specification Group Services and System Aspects; Functional stage 2 description of Location Services (LCS) (Release 9)", 3GPP TS 23.271 V9.5.0, Dec. 2010, 1-166.

* cited by examiner

METHODS AND ARRANGEMENTS FOR ESTIMATING TIMING OFFSET DIFFERENCES IN A CELLULAR NETWORK

TECHNICAL FIELD

Embodiments herein relate to a network node and a method in a network node. In particular, embodiments herein relate to estimating timing offset differences in a cellular network.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spècial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the context of this disclosure, a base station as described above will be referred to as a base station or a Radio Base Station (RBS). A user equipment as described above, will in this disclosure be referred to as a user equipment or a UE.

The expression DownLink (DL) will be used for the transmission path from the base station to the user equipment. The expression UpLink (UL) will be used for the transmission path in the opposite direction i.e. from the user equipment to the base station.

The base stations in the cellular network are generally not time synchronized. This results in a timing offset difference between the base stations, which may also be referred to as a "timing relation" between the base stations.

Accurate timing relation information of base stations may be necessary for several purposes, for example for positioning of a user equipment.

Positioning of a user equipment in the cellular network may be based on measurements of the time of flight, i.e. of the time it takes for a radio signal to move between the user equipment and several respective base stations in its vicinity, or measurements of the differences between the times of flight between the user equipment and the respective base stations, e.g. measurements of the so called Time Difference Of Arrival (TDOA).

The time of flight of radio signals may be converted to an absolute distance by multiplying with the speed of light. If the times of flight between the user equipment and at least three base stations with known positions, or the differences of the respective times of flight, are measured, the user equipment's position may be estimated by so called trilateration, or multilateration, techniques. This will be described further down in this document.

Positioning methods using this principle include Enhanced Observed Time Difference (E-OTD), Uplink Time Difference of Arrival (UTDOA) and Observed Time Difference of Arrival (OTDOA). These methods are very similar in terms of their requirements on timing accuracy, and E-OTD is actually the 2G version OTDOA. All the above positioning methods have strict requirements on base station clock accuracy, and the timing offset differences of the involved base stations are parameters to be used during position calculation.

A problem is that such timing relation information may be either hard to obtain or may not be provided with good reliability due to implementation reasons.

One way to estimate the timing offset of a base station, is to compare the base station clock to a synchronization pulse from a Global Navigation System Satellite (GNSS), which may be received by a so called GNSS receiver.

A problem is that it is hard for the base station to achieve a timing accuracy better than about 100 ns. Even with a GNSS receiver, the 1 pps (pulse per second) signal from GNSS has limited accuracy, e.g. 100 ns, and is subject to some other factors such as the physical distance between the GNSS receiver and the base station.

For positioning purposes, the synchronization may need to be done to a level of accuracy of the order of tens of nanoseconds, as 10 nanoseconds uncertainty contributes 3 meters error in the position estimate.

Moreover, even after synchronization of base stations, drift and jitter in the synchronization timing must also be well-controlled as these also contribute to uncertainty in the position estimate.

Information about timing relations between base stations in the cellular network, i. e. the timing offset differences between the base stations, may also be required for other purposes than for positioning of user equipments. For example in LTE-TDD, Multicast Broadcast Single Frequency Network (MBSFN), Coordinated MultiPoint (CoMP), and enhanced Inter Cell Interference Cancellation (ICIC) in 3GPP specifications.

A problem is that sometimes the solution may be costly and subject to environment change. For example, a GNSS receiver may be required, and this normally may not function properly indoors.

SUMMARY

In view of the discussion above, it is an object for embodiments herein to provide an improved way of estimating timing offset differences between base stations in a cellular network.

According to a first aspect, the object is achieved by a method in a first network node for estimating a first timing offset difference between a first timing offset of a first base station and a second timing offset of a second base station. The first network node, the first base station and the second base station are comprised in a cellular network. The first network node receives Uplink Time Difference Of Arrival, UTDOA, measurements from a second network node. The UTDOA measurements relate to a first UTDOA time difference between a first measured receiving time when an uplink signal from a user equipment is received at the first base station, and a second measured receiving time when the uplink signal from the user equipment is received at the second base station. The first network node further receives Observed Time Difference Of Arrival, OTDOA, measurements from a third network node. The OTDOA measurements relate to a first measured OTDOA time difference between a third receiving time when a downlink signal from the first base station is received at the user equipment, and a fourth receiving time when a downlink signal from the second base station is received at the user equipment. The first network node estimates a first timing offset difference between a first timing offset of the first base station and a second timing offset of the second base station based on the first UTDOA time difference and the first measured OTDOA time difference.

According to a second aspect, the object is achieved by a first network node for estimating a first timing offset difference between a first timing offset of a first base station and a second timing offset of a second base station. The first network node, the first base station, and the second base station are comprised in a cellular network. The first network node comprises a receiver configured to receive Uplink Time Difference Of Arrival, UTDOA, measurements from a second network node. The UTDOA measurements relate to a first UTDOA time difference between a first measured receiving time when an uplink signal from a user equipment is received at the first base station, and a second measured receiving time when the uplink signal from the user equipment is received at the second base station. The receiver is further configured to receive Observed Time Difference Of Arrival, OTDOA, measurements from a third network node. The OTDOA measurements relate to a measured OTDOA time difference between a third receiving time when a downlink signal from the first base station is received at the user equipment, and a fourth receiving time when a downlink signal from the second base station is received at the user equipment. The first network node further comprises an estimation unit configured to estimate a first timing offset difference between a first timing offset of the first base station and a second timing offset of the second base station based on the first UTDOA time difference and the first measured OTDOA time difference.

According to embodiments herein, by estimating the timing offset difference based on both UTDOA and OTDOA measurements, a very accurate relative timing information may be obtained without using a GNSS receiver. The relative timing relation may actually be more accurate than absolute timing information, e.g. GNSS timing, because it avoids the introducing GNSS system errors, which may be up to +/−100 ns.

DETAILED DESCRIPTION

Embodiments herein may be exemplified in the following non-limiting description of embodiments.

As part of the development of the embodiments herein, the OTDOA positioning principle and the UTDOA positioning principle will first be explained.

As previously mentioned, methods for positioning a user equipment in a cellular network may be based on time difference of arrival, TDOA, measurements of radio signals between the user equipment and several respective base stations. By measuring the respective TDOAs of radio signals, or radio frames, transmitted between a user equipment and at least three base stations with known positions, the user equipment position may be estimated by so called trilateration or multilateration techniques, which will be described below.

The usefulness of the measurements depends on how well the involved base stations are time synchronized, or, if they are not time synchronized, on how well the resulting timing offset differences may be estimated and compensated for.

Downlink TDOA measurements, i.e. measurements relating to the TDOA, measured at a user equipment, of downlink signals from at least two base stations, will in the following be referred to as Observed TDOA (OTDOA) measurements, since this time difference may be measured, or observed, directly by the user equipment.

By "downlink signal", also referred to as a "DL signal", in the following, is meant a downlink signal from a base station, which downlink signal may be a certain radio frame, a downlink signal period, or a part of a downlink signal.

Uplink TDOA (UTDOA) measurements, on the other hand, i.e. measurements relating to the TDOA, measured at the base stations, of a signal from the user equipment, refers to a respective measured receiving time, Time of Arrival (TOA), at each involved base station. The actual UTDOA is then derived by computing the difference between the measured TOA:s.

By "uplink signal", also referred to as an "UL signal", in the following, is meant an uplink signal from a user equipment, which uplink signal may be a certain radio frame, an uplink signal period, or a part of an uplink signal.

By multiplying the TDOA measurements with the speed of light, the user equipments position may be restricted to a hyperbola with constant distance in relation to the two base stations.

The technique of combining several TDOA measurements and determining the intersection of several hyperbolas, or hyperbolic functions, to estimate a position, is called multilateration, and will in the following be described with reference to FIG. 1.

Figure 1:
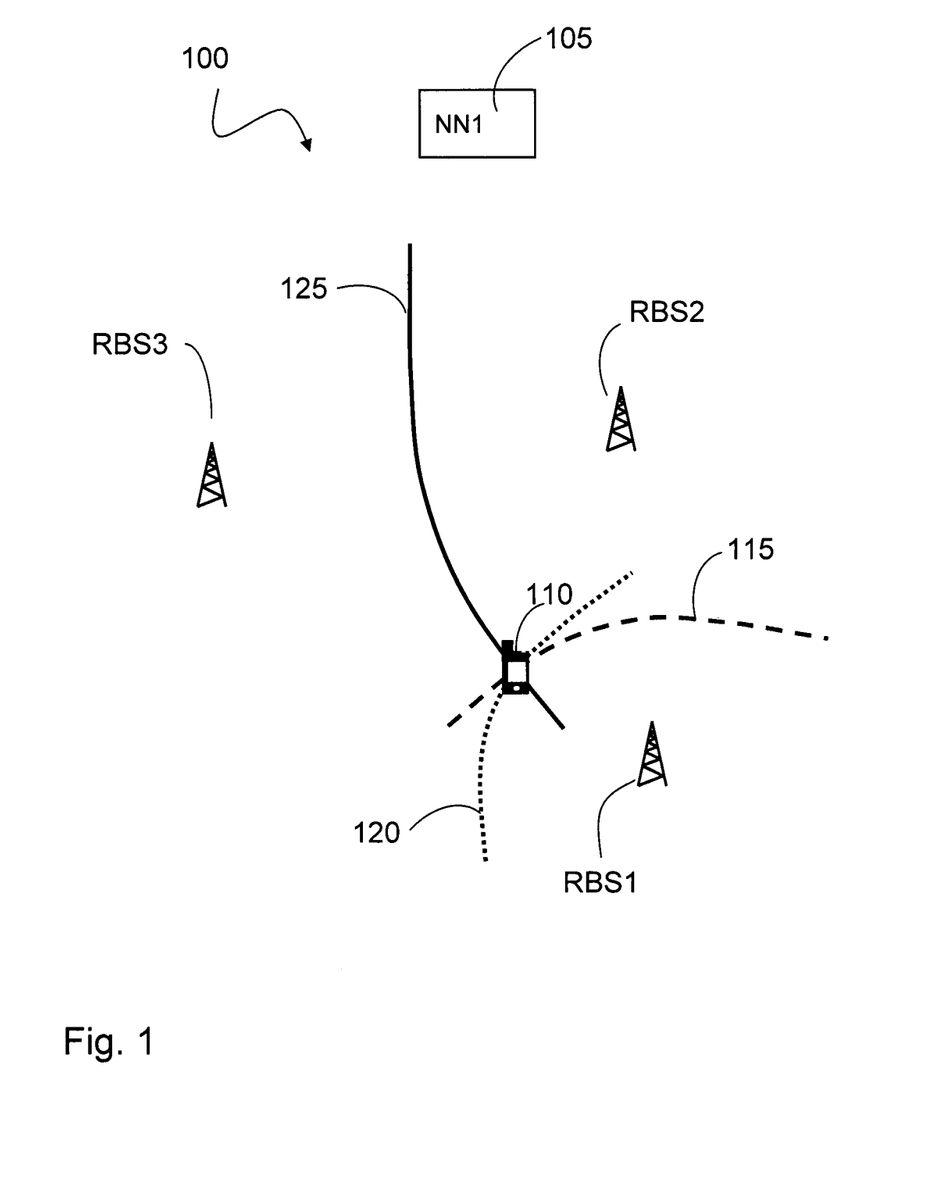
FIG. 1 is a schematic block diagram illustrating an embodiment of a cellular network.

FIG. 1 depicts a cellular network 100. The cellular network 100 may be a LTE cellular network, a WCDMA cellular network, a GSM cellular network, any 3GPP cellular network, or any other cellular network.

The cellular network 100 comprises a first base station RBS1, a second base station, RBS2, and a third base station RBS3. The base stations are networks nodes that may be radio base stations such as eNodeBs, Home Node Bs, Home eNode Bs, GSM/EDGE radio base stations, or any other base stations.

The cellular network 100 further comprises a first Network Node (NN1) 105, which in this example is a positioning server. It is worth noting that such a positioning server may be physical or logical. For example, it may be located inside other physical network nodes, such as e.g. a base station. In 2G/3G radio access networks, a positioning server is referred to as a Serving Mobile Location Center (SMLC), in LTE, SMLC is evolved to Evolved Serving Mobile Location Center (E-SMLC) which is a network node which is able to communicate with eNodeBs via a Mobility Management Entity (MME). The first network node 105 may be a radio network node or a core network node.

The radio access network 100 further comprises a User Equipment (UE) 110.

The user equipment 110 is a network node that may be a mobile station or a user equipment unit such as a mobile telephone, also known as a "cellular" telephone, or a laptop with wireless capability, and thus may be, for example, a portable, pocket, hand-held, computer-included, or car-mounted mobile device which communicates voice and/or data with the cellular network 100. The user equipment 110 may also be referred to as a network node.

FIG. 1 schematically illustrates an ideal situation where all base stations are time synchronised and transmit a respective downlink signal at exactly the same point in time. By measuring, at the user equipment 110, the OTDOA of the downlink signal from the first base station RBS1 and the downlink signal from the second base station RBS2, the position of the user equipment 110 may be estimated to a first hyperbola 115. By measuring, at the user equipment 110, the OTDOA of the downlink signal from the first base station RBS1 and the downlink signal from the third base station RBS3, the position of the user equipment 110 may be estimated to a second hyperbola 120. Finally, by measuring, at the user equipment 110, the OTDOA of the downlink signal from the second base station RBS2 and the downlink signal from the third base station RBS3, the position of the user equipment 110 may be estimated to a third hyperbola 125.

Multilateration then results in a position estimate corresponding to the intersection of the three hyperbolas 115, 120, 125, which intersection is the true position of the user equipment 110 in this ideal example.

Figure 2:
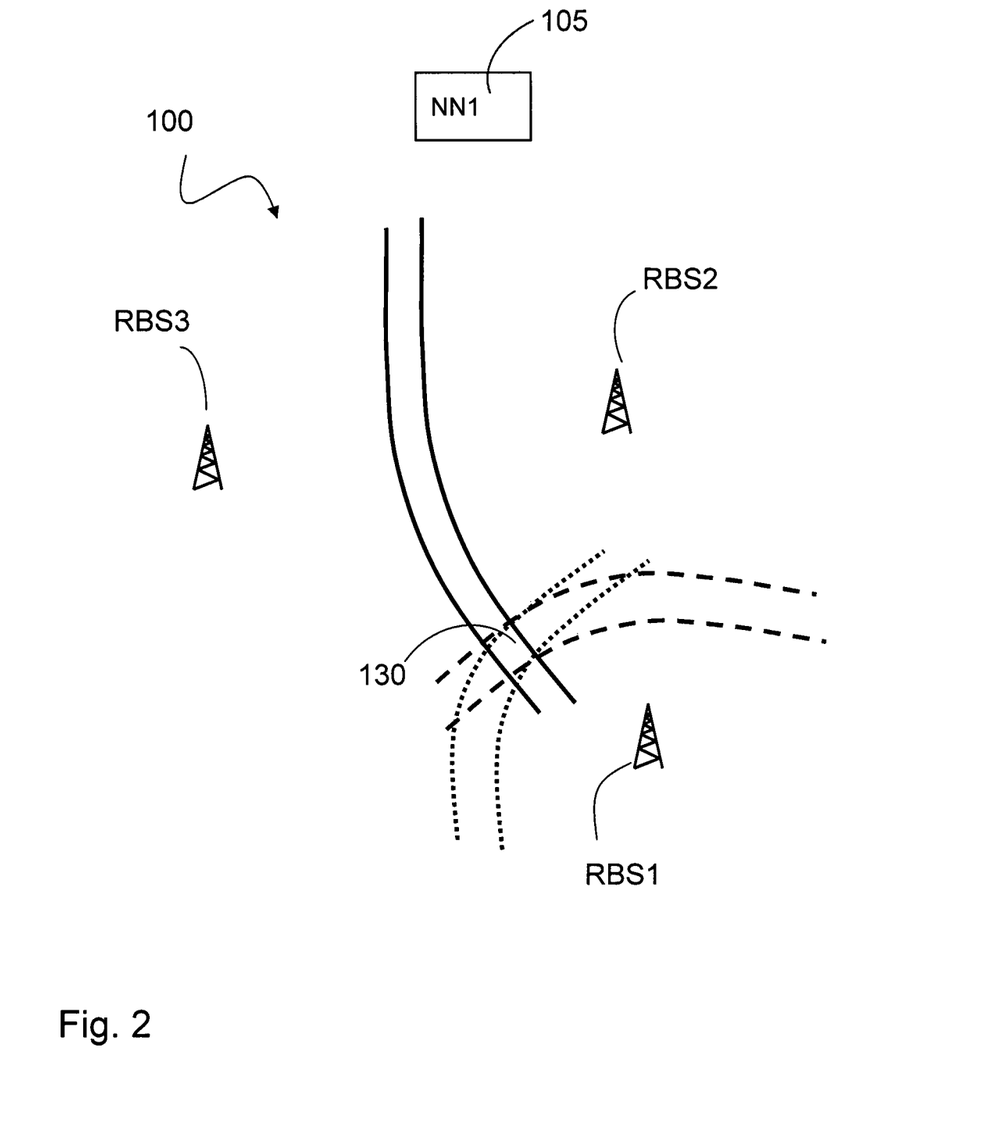
FIG. 2 is a schematic block diagram illustrating an embodiment of a cellular network.

However, in a realistic scenario, the base stations RBS1, RBS2 and RBS3 are not perfectly time synchronized to each other. This is illustrated in FIG. 2. As can be seen in this illustration, unknown timing offset differences between the base stations give rise to uncertainties in the hyperbolic functions, and hence the intersection is an area 130 instead of a point. Hence, in a realistic scenario with timing offset differences, OTDOA measurements and multilateration will not give a unique position estimate for the user equipment 110.

Similarly, positioning techniques based on UTDOA measurements degrade with increased timing offset differences between the involved base stations, since the TOA of an uplink signal at one base station will be measured relative to a different clock offset than the TOA of the same uplink signal at another base station if the base station clocks are not time synchronized with each other.

Figure 3:
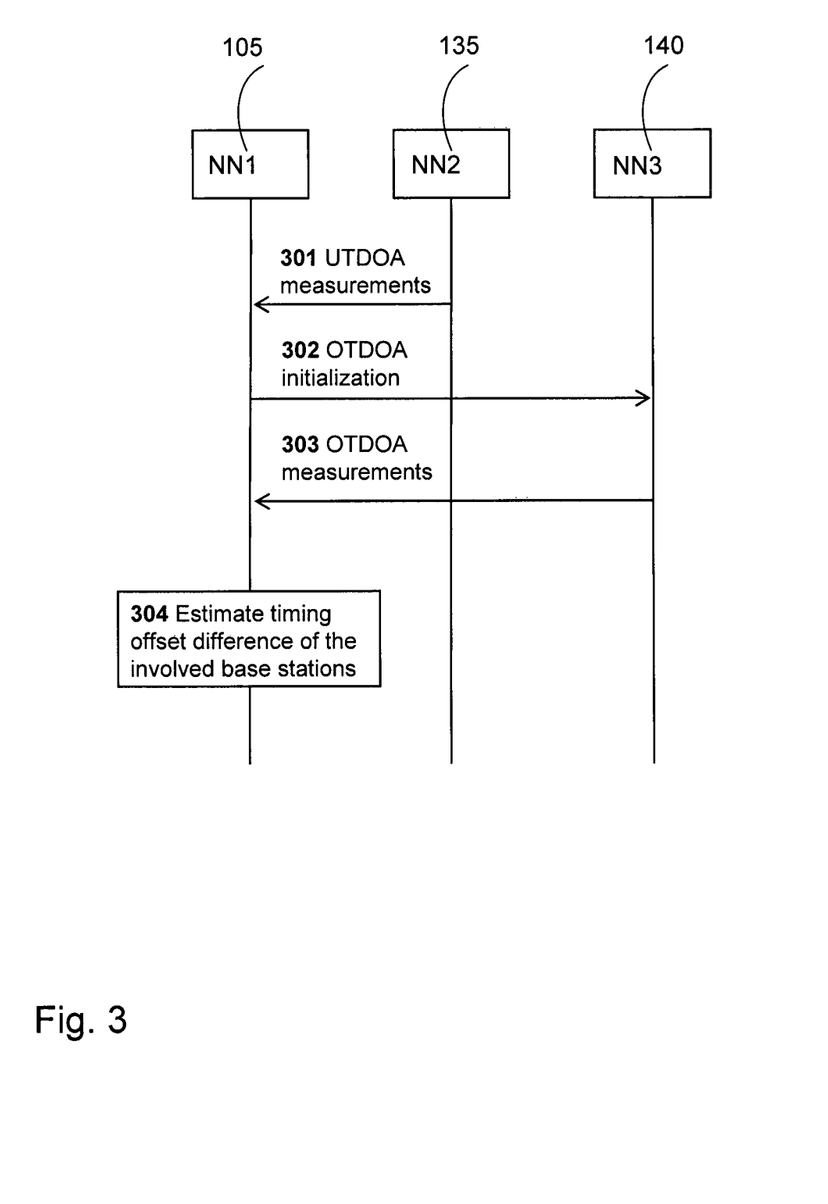
FIG. 3 is a combined signalling scheme and flowchart illustrating embodiments in a cellular network.

FIG. 3 is a combined flowchart and signalling scheme, illustrating how a method according to embodiments herein for estimating timing offset differences between three base stations may be implemented in the cellular network 100 depicted in FIGS. 1 and 2.

It should be noted that the actions which will be referred to may in another embodiment be performed in another suitable order. In this example, the first base station RBS1, the second base station RBS2, and the third base station RBS3 are not synchronised and have different timing offsets.

Action 301

In this action, the first network node NN1 105, which in this example is a positioning server, collects UTDOA measurements from a second network node, NN2, 135. The UTDOA measurements relate to a UTDOA time difference between a measured receiving time when an uplink signal from the user equipment 110 is received at the first base station RBS1, and a measured receiving time when the uplink signal from the user equipment 110 is received at the second base station RBS2. The UTDOA measurements also relate to a UTDOA time difference between a measured receiving time when the uplink signal from the user equipment 110 is received at the third base station RBS3 and the measured receiving time when the uplink signal from the user equipment 110 is received at the first base station RBS1.

In 2G/3G, this action may be between the positioning server, e.g. SMLC, and a Location Measurement Unit (LMU). In LTE, this action may be between the positioning server, e.g. E-SMLC, and eNB or between E-SMLC and LMU, or eNB and LMU. Such collection may be LMU/eNB initiated, or positioning server initiated.

As previously mentioned, the uplink signal may be a certain radio frame, an uplink signal period, or a part of an uplink signal.

Action 302

In this action, the positioning server initiates OTDOA positioning flow towards a third network node, NN3, 140. In 2G/LTE, this action is towards the user equipment 110 with protocol RRLP/LPP. In 3G, this action is towards a RNC since OTDOA is defined in the Radio Resource Control (RRC). This action may be performed in sequence with, or parallel to, action 301. In LTE, the positioning server has the option to initiate UTDOA and OTDOA measurements in parallel, which may be more efficient.

It is worth noting that action 302 may also be performed in User Plane, i.e. by SUPL Location Platform (SLP) initiating OTDOA flow towards an SUPL Enabled Terminal (SET). It may be possible for ESMLC to receive OTDOA measurements from SLP via a non-standard interface. User Plane location architecture is based on direct IP connection between server and terminal which is less dependent on the radio access type and network signaling.

Action 303

In this action, OTDOA measurements are sent back to the first network node 105, i.e. to the positioning server in this example. The OTDOA measurements relate to a measured OTDOA time difference between a receiving time when a downlink signal from the first base station, RBS1, is received at the user equipment 110 and a receiving time when a downlink signal from the second base station RBS2 is received at the user equipment 110. The OTDOA measurements also relate to a second measured OTDOA time difference between a receiving time when a downlink signal from the third base station RBS3 is received at the user equipment 110, and the third receiving time when the downlink signal from the first base station RBS1 is received at the user equipment 110.

As previously mentioned, the respective downlink signals may be a certain radio frame, a downlink signal period, or a part of a downlink signal from the respective base stations RBS1 and RBS2.

Action 304

In this action, the first network node 105 estimates the timing offset differences between the involved base stations RBS1 and RBS2 and RBS3 based on the UTDOA measurements and the OTDOA measurements. How this is done is further elaborated in below sections, with reference to FIG. 4 and FIG. 5.

Figure 4:
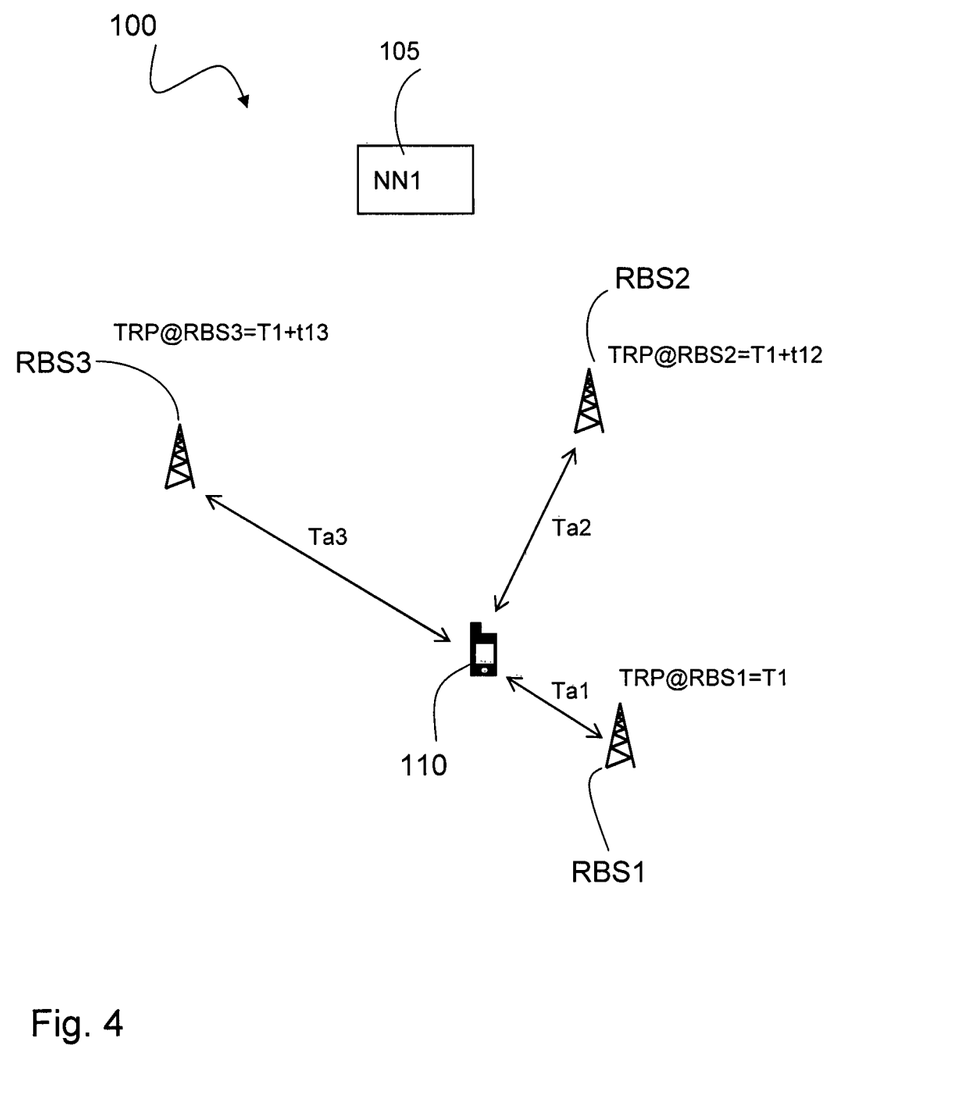
FIG. 4 is an illustration of timing relations in a cellular network.

FIG. 4 illustrates exemplary respective timing offsets of the first base station RBS1, the second base station RBS2, and the third base station RBS3 in the cellular network 100 depicted in FIG. 1 and FIG. 2. The cellular network 100 is in this example, as previously mentioned, assumed not to be synchronized.

The different timing offsets, or clock offsets, of the base stations RBS1, RBS2 and RBS3, i.e. the different Time Reference Points (TRPs), are illustrated in FIG. 4, with relevant definitions below, and will be further discussed below in relation to FIG. 5.

TRP of a base station is the timing reference point, i.e. the timing offset, for a particular base station. The TRP for a base station is hence the reference relative to which the receiving time of the uplink signal, and the transmission time of the downlink signal, are measured at the base station.

t12: Timing offset difference between RBS2 and RBS1
t13: Timing offset difference between RBS3 and RBS1
Ta1: Signal propagation delay from UE 110 to RBS1
Ta2: Signal propagation delay from UE 110 to RBS2
Ta3: Signal propagation delay from UE 110 to RBS3

Figure 5:
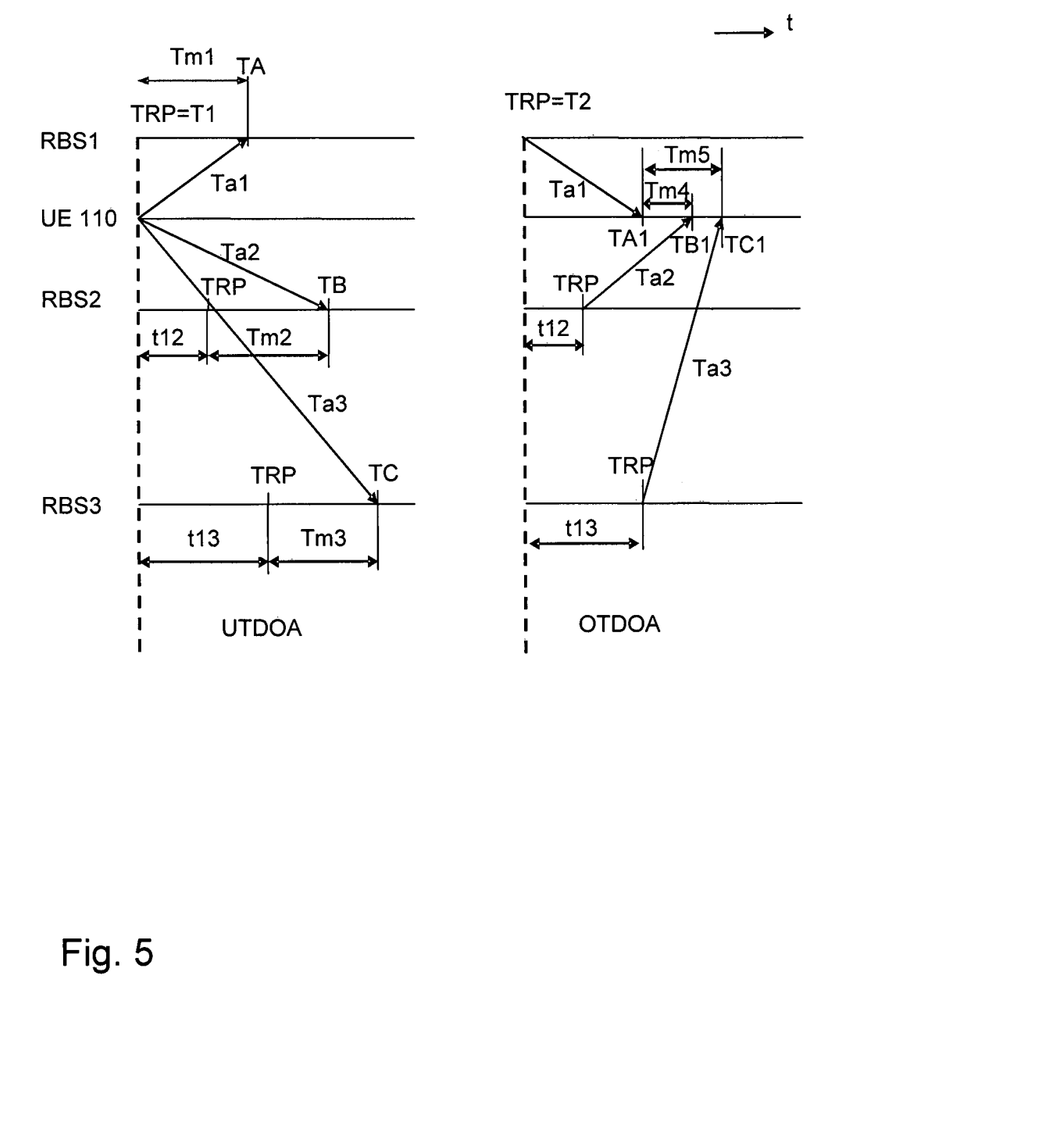
FIG. 5 is an illustration related to embodiments herein involving three base stations.

FIG. 5 illustrates the timings of the UTDOA measurements in the left half of the illustration, and the timings of the OTDOA measurements in the right half of the illustration. "UE 110" in the following and in the figures refer to the user equipment 110.

The horizontal axis is the absolute time. The measured receiving times, and measured receiving time differences, are relative to the respective timing offsets, TRPs.

For UTDOA, the measurements at the base stations are actually Tm1, Tm2, Tm3 in FIG. 5. Note that for the convenience of illustration, user equipment 110 transmission time is set to TRP.

TRP may be referred to as System Frame Number 0, SFN0, start time of the reference eNB in case of LTE access.

In the following, the notation in FIG. 5 will be explained.

By "UL signal" in the following is meant the uplink signal which, as previously mentioned, may be a certain radio frame, subframe and/or timeslot of an uplink signal from the user equipment 110.

By "DL signal" in the following is meant the downlink signal from the respective base station, which, as previously mentioned, may be a certain radio frame, subframe and/or timeslot of the downlink signal.

TA: The absolute time when RBS1 receives the UL signal from UE 110

TB: The absolute time when RBS2 receives the UL signal from UE 110

TC: The absolute time when RBS3 receives the UL signal from UE 110

TA1: The absolute time when UE 110 receives the DL signal from RBS1

TB1: The absolute time when UE 110 receives the DL signal from RBS2

TC1: The absolute time when UE 110 receives the DL signal from RBS3

T1: the absolute time of RBS1 TRP. Note that UE 110, i.e. the user equipment 110, is also assumed to transmit the UL signal for RBS1, RBS2 and RBS3 to measure at this moment.

T2: the absolute time of RBS1 TRP, different TRP moment other than T1. Note that RBS1 is also assumed to transmit the DL signal for UE 110, i.e. user equipment 110, to measure at this moment.

Tm1: The measured receiving time of UL signal relative to TRP at RBS1

Tm2: The measured receiving time of UL signal relative to TRP at RBS2

Tm3: The measured receiving time of UL signal relative to TRP at RBS3

Tm4: The time difference, measured at the user equipment 110, between the time when the DL signal from RBS2 is received and the time when the DL signal from RBS1 is received.

Tm5: The time difference, measured at the user equipment 110, between the time when the DL signal from RBS3 is received and the time when the DL signal from RBS1 is received.

Based on definitions as above, it can be seen that in UTDOA:

$$TA-T1=Ta1=Tm1 \qquad (1)$$

$$TB-T1=Ta2=Tm2+t12 \qquad (2)$$

$$TC-T1=Ta3=Tm3+t13 \qquad (3)$$

Since Tm1, Tm2 and Tm3 are measured by RBS1, RBS2 and RBS3 respectively, from equation (2) and (1), there is:

$$Tm2-Tm1+t12=Ta2-Ta1 \qquad (4)$$

$$Tm3-Tm1+t13=Ta3-Ta1 \qquad (5)$$

According to the principle of OTDOA, there is:

$$TA1=Ta1$$

$$TB1=Ta2+t12$$

$$TC1=Ta3+t13$$

The OTDOA measurements reported by the user equipment 110 are then:

$$TB1-TA1=Ta2-Ta1+t12=tm4 \quad (6)$$

$$TC1-TA1=Ta3-Ta1+t13=tm5 \quad (7)$$

The following may be assumed:

(1) DUUL channel characteristics are reciprocal, so UTDOA and OTDOA measurements are impacted by multipath and Doppler effect in the same way. This assumption is normally valid in TDD mode. For FDD, the imparity can be negligible in some cases e.g. rural areas.

(2) During UTDOA and OTDOA flow, the terminal is assumed to be standstill or with negligible maneuver.

OTDOA and UTDOA measurements may be combined to deduce timing offset information. The results below may be obtained from equation set (4), (5), (6) and (7):

$$t12=(Tm4-Tm2+Tm1)/2 \quad (8)$$

$$t13=(Tm5-Tm3+Tm1)/2 \quad (9)$$

Therefore, the conclusion is that if Tm1, Tm2, Tm3, Tm4 and Tm5 may be aggregated and received by the first network node 105, e.g. E-SMLC in EPC, the procedure elaborated above may be employed to derive the timing offset differences among relevant base stations.

Hence, according to embodiments herein, it is possible to estimate the timing offset difference t12 between the first base station RBS1 and the second base station RBS2 based on the difference between the measured OTDOA time difference Tm4 and the UTDOA time difference between the measured receiving times Tm2 and Tm1.

In the same way, according to embodiments herein, it is possible to estimate the timing offset difference t13 between the first base station RBS1 and the third base station RBS3 based on the difference between the measured OTDOA time difference Tm5 and the UTDOA time difference between the measured receiving times Tm3 and Tm1.

The above example involves three base stations.

It is readily appreciated that estimation of the timing offset difference between two base stations only requires measurements relating to these two base stations.

Figure 6:
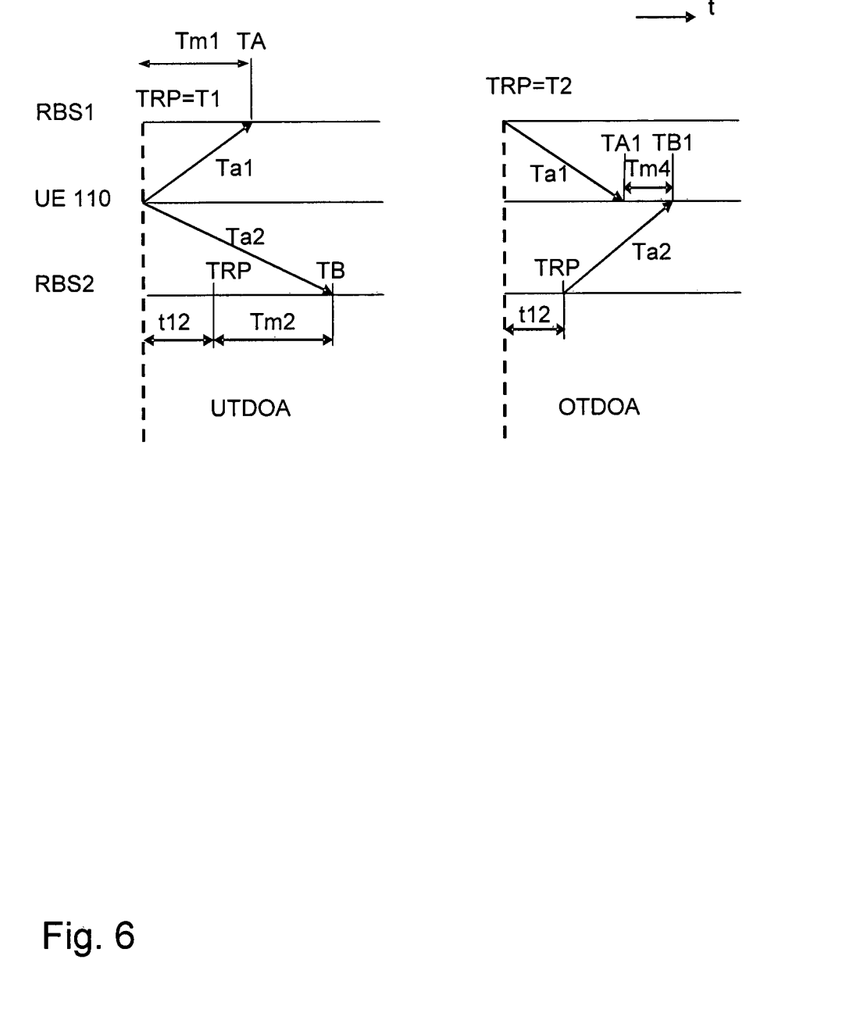
FIG. 6 is an illustration related to embodiments herein involving two base stations.

FIG. 6 is an illustration of the timings if only two base stations, the first base station RBS1 and the second base station RBS2, are involved.

Figure 7:
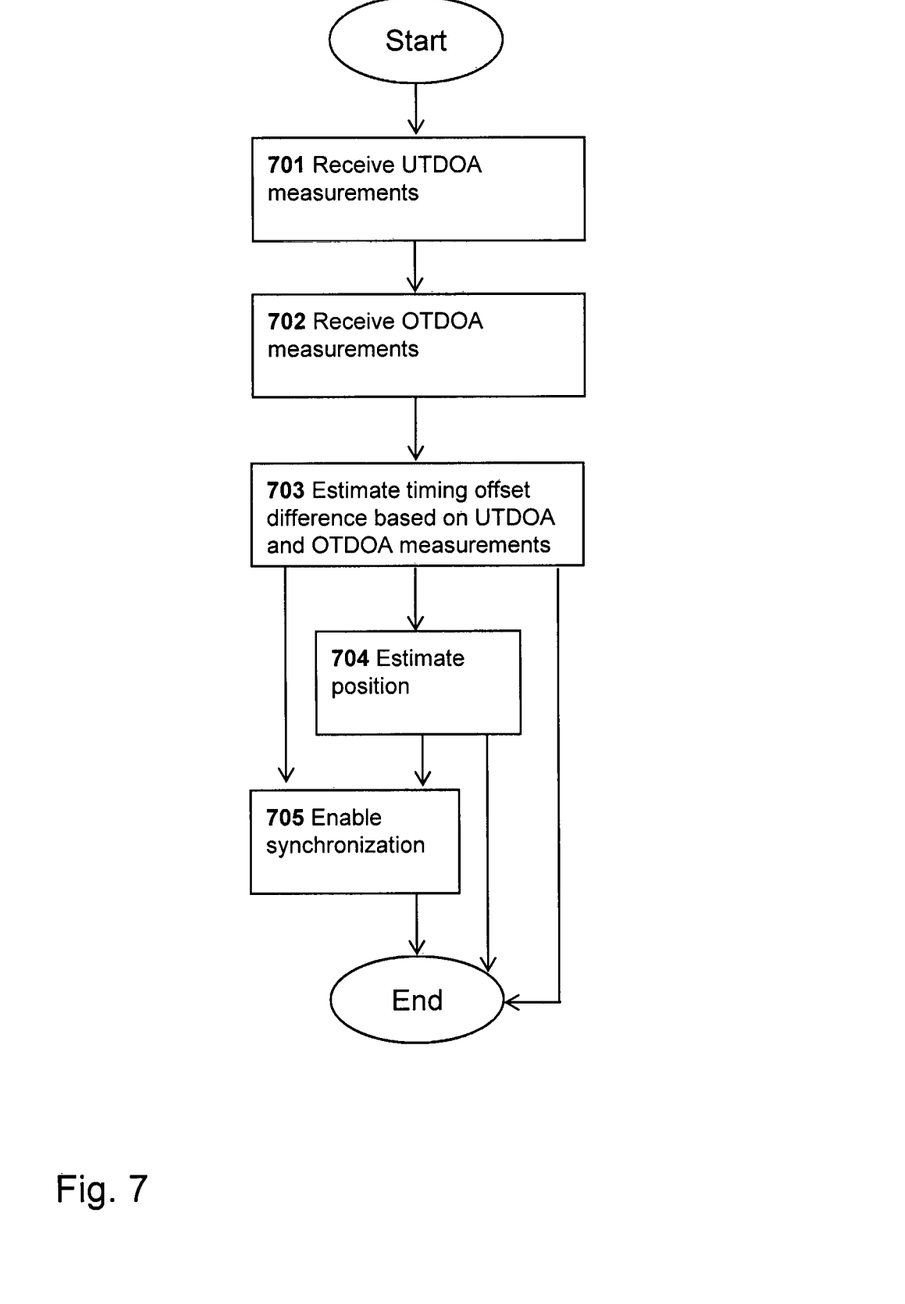
FIG. 7 is a flowchart depicting embodiments of a method in a first network node.

Embodiments herein, relating to a method in the first network node 105 in FIGS. 1, 2 and 4, for estimating a timing offset difference between the first base station RBS1 and the second base station RBS2, will now be described with reference to the flowchart depicted in FIG. 7, and with reference to the notation in FIGS. 5 and 6.

As previously mentioned, the first network node 105, the first base station RBS1, and the second base station RBS2 are comprised in the cellular network 100. The first network node 105 may be a positioning server, such as for example a SMLC or an E-SMLC. The second network node 135 may be one or more of the first base station RBS1, the second network node RBS2, and the third base station RBS3. The third network node 135 may be an LMU. In some embodiments, the second network node 135 may be another suitable network node.

The method comprises the following actions, which actions may be taken in any suitable order:

Action 701

In this action, the first network node 105 receives UTDOA measurements from a second network node. The UTDOA measurements relate to a first UTDOA time difference between a first measured receiving time, Tm1, when an uplink signal from the user equipment 110 is received at the first base station RBS1, and a second measured receiving time, Tm2, when the uplink signal from the user equipment 110 is received at the second base station RBS2.

According to some embodiments, the UTDOA measurements further relate to a second UTDOA time difference between a fifth measured receiving time, Tm3, when the uplink signal from the user equipment 110 is received at the third base station RBS3, and the first measured receiving time, Tm1, when the uplink signal from the user equipment 110 is received at the first base station RBS1.

This action corresponds to the previously described action 301, and may be performed in the same, or a similar way, and may involve the same network nodes.

The uplink signal may be a certain radio frame, subframe and/or timeslot or part of an uplink signal from the user equipment 110.

Action 702

In this action, the first network node 105 receives OTDOA measurements from the third network node 140. The OTDOA measurements relate to a first measured OTDOA time difference, Tm4, between a third receiving time when a downlink signal from the first base station RBS1 is received at the user equipment 110, and a fourth receiving time when a downlink signal from the second base station RBS2 is received at the user equipment 110.

According to some embodiments, the OTDOA measurements further relate to a second measured OTDOA time difference, Tm5, between a sixth receiving time when a downlink signal from the third base station RBS3 is received at the user equipment 110 and the third receiving time when the downlink signal from the first base station RBS1 is received at the user equipment 110.

The third network node 140 may be for example the user equipment 110, or an RNC, or another suitable network node.

This action corresponds to the previously described action 303, and may be performed in the same, or a similar way, and may involve the same network nodes.

This action may also comprise an initiation of OTDOA positioning flow, such as that described in action 302.

The downlink signal may be a certain radio frame, subframe and/or timeslot or part of a downlink signal.

Action 703

In this action, the first network node 105 estimates a first timing offset difference, t12, between a first timing offset of the first base station RBS1 and a second timing offset of the second base station RBS2, based on the first UTDOA time difference and the first measured OTDOA time difference, Tm4.

According to some embodiments, the first timing offset difference, t12, is estimated as one half of the difference between the first measured OTDOA time difference, Tm4, and the first UTDOA time difference.

According to some embodiments, the first network node 105 further estimates a second timing offset difference, t13, between the first timing offset of the first base station RBS1 and a third timing offset of the third base station RBS3, wherein the estimation of the second timing offset difference, t13, is based on the second UTDOA time difference and the second measured OTDOA time difference, Tm5.

The second timing offset difference, t13, may be estimated as one half of the difference between the second measured OTDOA time difference, Tm5, and the second UTDOA time difference.

Action 704

This is an optional action, according to which the first network node 105 further estimates a position of the user equipment 110 based on at least one of the estimated first timing offset difference, t12, and the estimated second timing offset difference, t13.

Thanks to the estimated timing offset differences, t12, t13, an improved position estimate may be obtained, since the timing offset differences may be compensated for.

Action 705

This is also an optional action, according to which the first network node 105 synchronizes at least two of the first base station RBS1, the second base station RBS2, and the third base station RBS3, based on at least one of the estimated first timing offset difference, t12, and the estimated second timing offset difference, t13.

The synchronization may comprise sending at least one of the estimated first timing offset differences, t12, and the second timing offset difference, t13, to another network node to enable that network node to perform the synchronization of the base stations to each other.

Thanks to embodiments herein, a very accurate relative timing information, i.e. timing offset differences, is provided. This may for example improve OTDOA positioning without introducing a GNSS receiver.

Moreover, the relative timing relation may actually be more accurate than absolute timing information, e.g. GNSS timing, because it avoids introducing GNSS system errors, which, as previously mentioned, may be up to +/−100 ns.

Besides positioning purposes, embodiments herein may also be utilized to enhance Operation and Maintenance (O&M) systems and base station synchronization.

Due to security or reliability reasons, embodiments herein may be meaningful for countries that are not owners of any GNSS system.

Furthermore, embodiments herein may eliminate, or at least reduce, the need to calibrate the radio delay bias which is caused by base station hardware or internal transmission.

To eliminate or mitigate the impact of relative base station timing offset differences, one solution may be to always perform OTDOA and UTDOA at the same time, so that a positioning server can deduce out such timing offset differences and so that such differences can then be used for both UTDOA and OTDOA positioning.

From a realistic viewpoint, this may however not always be preferred considering that it is network resource consuming. Therefore, the first network node 105 may instead in some embodiments have the option to store the estimated timing offset differences t12 and/or t13 for subsequent use for UTDOA or OTDOA position calculation for other user equipments.

Figure 8:
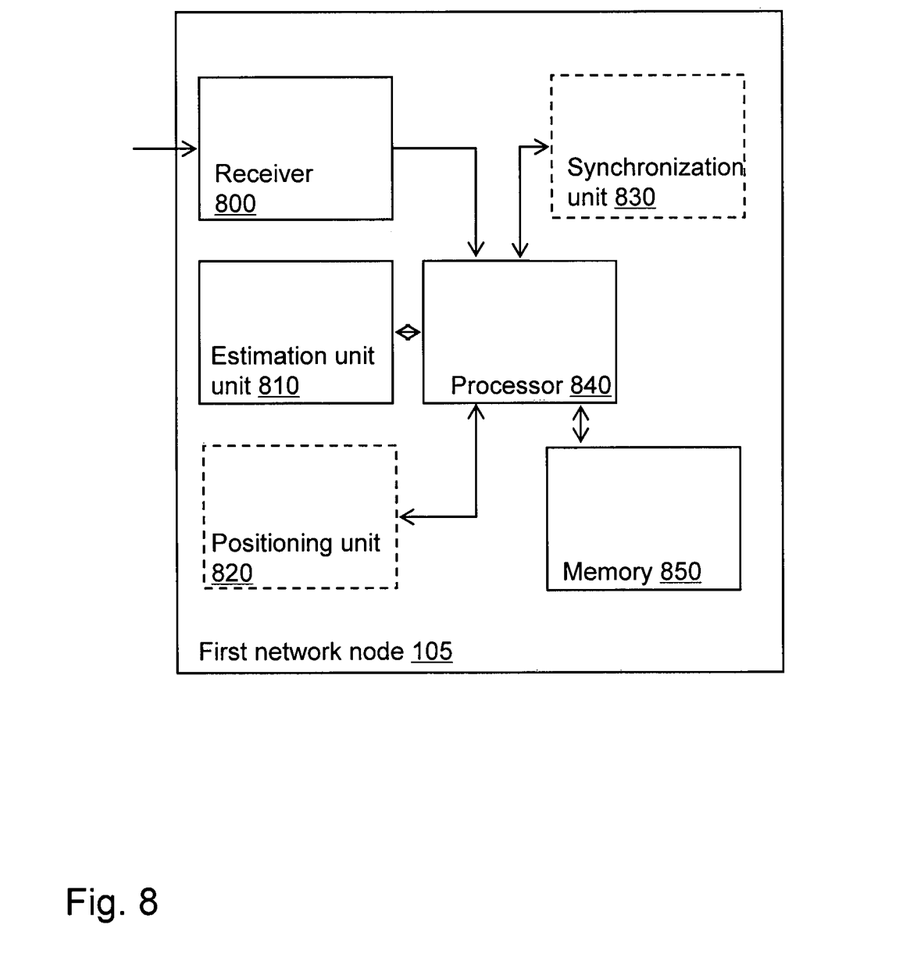
FIG. 8 is a schematic block diagram illustrating embodiments of a first network node.

To perform the actions above for estimating a first timing offset difference, t12, between a first timing offset of a first base station RBS1 and a second timing offset of a second base station RBS2, the first network node 105 comprises an arrangement schematically depicted in FIG. 8. As mentioned above, the first network node 105, the first base station RBS1 and the second base station RBS2 are comprised in a cellular network 100. The first network node 105 may be a positioning server, such as an SMLC, an E-SMLC, or another suitable network node. The term "configured to" used herein may also be referred to as "arranged to".

The first network node 105 comprises a receiver 800, configured to receive uplink time difference of arrival, UTDOA, measurements from a second network node 135. The UTDOA measurements relate to a first UTDOA time difference between a first measured receiving time, Tm1, when an uplink signal from a user equipment 110 is received at the first base station RBS1 and a second measured receiving time Tm2 when the uplink signal from the user equipment 110 is received at the second base station RBS2. The receiver 800 is further configured to receive observed time difference of arrival, OTDOA, measurements from a third network node 140. The OTDOA measurements relate to a measured OTDOA time difference, Tm4, between a third receiving time when a downlink signal from the first base station RBS1 is received at the user equipment 110, and a fourth receiving time when a downlink signal from the second base station RBS2 is received at the user equipment 110.

According to some embodiments, the UTDOA measurements further relate to a second UTDOA time difference between a fifth measured receiving time, Tm3, when the uplink signal from the user equipment 110 is received a third base station RBS3, and the first measured receiving time, Tm1, when the uplink signal from the user equipment 110 is received at the first base station RBS1, and the OTDOA measurements further relate to a second measured OTDOA time difference, Tm5, between a sixth receiving time when a downlink signal from the third base station RBS3 is received at the user equipment 110 and the third receiving time when the downlink signal from the first base station RBS1 is received at the user equipment 110.

The first network node 105 further comprises an estimation unit 810, configured to estimate a first timing offset difference, t12, between a first timing offset of the first base station RBS1 and a second timing offset of the second base station RBS2 based on the first UTDOA time difference and the first measured OTDOA time difference, Tm4.

According to some embodiments, the estimation unit 810 is further configured to estimate the first timing offset difference, t12, as one half of the difference between the first measured OTDOA time difference, Tm4, and the first UTDOA time difference.

According to some embodiments, the estimation unit 810 is further configured to estimate the second timing offset difference, t13, as one half of the difference between the second measured OTDOA time difference, Tm5, and the second UTDOA time difference.

According to some embodiments, the first network node 105 further comprises a positioning unit 820, configured to estimate a position of the user equipment 110 based on at least one of the estimated first timing offset difference, t12, and the estimated second timing offset difference, t13.

According to some embodiments, the first network node 105 further comprises a synchronization unit 830, configured to synchronize at least two of the first base station RBS1, the second base station RBS2, and the third base station RBS3, based on at least one of the estimated first timing offset difference, t12, and the estimated second timing offset difference, t13.

The embodiments of the first network node 105 for estimating a first timing offset difference, t12, between a first timing offset of a first base station RBS1 and a second timing offset of a second base station RBS2 may be implemented through one or more processors, such as a processor 840 in the first network node 105 depicted in FIG. 8, together with computer program code for performing the actions of embodiments herein.

The program code mentioned above may also be provided as a computer program product, for instance in the form of a data carrier carrying computer program code for performing the embodiments herein when being loaded into the first network node 105.

One such carrier may be in the form of a CD ROM disc. It is however feasible with other data carriers such as a memory stick. The computer program code may furthermore be provided as pure program code on a server and downloaded to the first network node 105 e.g. remotely.

The first network node 105 may further comprise a memory 850 comprising one or more memory units. The memory 860 is arranged to be used to store data such as for example the UTDOA measurements, the OTDOA measurements, the first timing offset difference, t12, or the second timing offset difference, t13. It may further be arranged to store applications to perform the actions of the embodiments herein when being executed in the first network node 105.

The embodiments are not limited to the above-described embodiments. Various alternatives, modifications and equivalents may be used.

When using the word "comprise" or "comprising" it shall be interpreted as non-limiting, i.e. meaning "consist at least of".

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a first network node for estimating a first timing offset difference between a first timing offset of a first base station and a second timing offset of a second base station, wherein the first network node, first base station, and second base station are comprised in a cellular network, and wherein the method comprises:
   receiving Uplink Time Difference Of Arrival, UTDOA, measurements from a second network node, which UTDOA measurements relate to a first UTDOA time difference between a first measured receiving time when an uplink signal from a user equipment is received at the first base station, and a second measured receiving time when the uplink signal from the user equipment is received at the second base station;
   receiving Observed Time Difference Of Arrival, OTDOA measurements from a third network node, which OTDOA measurements relate to a first measured OTDOA time difference between a third receiving time when a downlink signal from the first base station is received at the user equipment and a fourth receiving time when a downlink signal from the second base station is received at the user equipment; and
   estimating a first timing offset difference between a first timing offset of the first base station and a second timing offset of the second base station, based on the first UTDOA time difference and the first measured OTDOA time difference.

2. The method according to claim 1, wherein the first timing offset difference is estimated as one half of the difference between the first measured OTDOA time difference and the first UTDOA time difference.

3. The method according to claim 1, wherein the UTDOA measurements further relate to a second UTDOA time difference between a fifth measured receiving time when the uplink signal from the user equipment is received at a third base station and the first measured receiving time when the uplink signal from the user equipment is received at the first base station, wherein the OTDOA measurements further relate to a second measured OTDOA time difference between a sixth receiving time when a downlink signal from the third base station is received at the user equipment, and the third receiving time when the downlink signal from the first base station is received at the user equipment, and wherein the estimating further comprises estimating a second timing offset difference between the first timing offset of the first base station and a third timing offset of the third base station, and wherein the estimation of the second timing offset difference is based on the second UTDOA time difference and the second measured OTDOA time difference.

4. The method according to claim 3, wherein the second timing offset difference is estimated as one half of the difference between the second measured OTDOA time difference and the second UTDOA time difference.

5. The method according to claim 1, further comprising estimating a position of the user equipment based on at least one of the estimated first timing offset difference and the estimated second timing offset difference.

6. The method according to claim 1, further comprising synchronizing at least two of the first base station, the second base station, and the third base station, based on at least one of the estimated first timing offset difference and the estimated second timing offset difference.

7. A first network node configured for operation in a cellular network and further configured for estimating a first timing offset difference between a first timing offset of a first base station in the network and a second timing offset of a second base station in the network, wherein the network node comprises:
   a receiver configured to receive Uplink Time Difference Of Arrival, UTDOA, measurements from a second network node, which UTDOA measurements relate to a first UTDOA time difference between a first measured receiving time when an uplink signal from a user equipment is received at the first base station and a second measured receiving time when the uplink signal from the user equipment is received at the second base station, wherein the receiver is further configured to receive Observed Time Difference Of Arrival, OTDOA, measurements from a third network node, wherein the OTDOA measurements relate to a measured OTDOA time difference between a third receiving time that a downlink signal from the first base station is received at the user equipment and a fourth receiving time that a downlink signal from the second base station is received at the user equipment; and
   an estimation unit configured to estimate a first timing offset difference between a first timing offset of the first base station and a second timing offset of the second base station, based on the first UTDOA time difference and the first measured OTDOA time difference.

8. The first network node according to claim 7, wherein the estimation unit is further configured to estimate the first timing offset difference as one half of the difference between the first measured OTDOA time difference and the first UTDOA time difference.

9. The first network node according to claim 7, wherein the UTDOA measurements further relate to a second UTDOA time difference between a fifth measured receiving time that the uplink signal from the user equipment is received a third base station and the first measured receiving time that the uplink signal from the user equipment is received at the first base station, wherein the OTDOA measurements further relate to a second measured OTDOA time difference between a sixth receiving time that a downlink signal from the third base station is received at the user equipment and the third receiving time that the downlink signal from the first base station is received at the user equipment, and wherein the estimation unit is further configured to estimate a second timing offset difference between the first timing offset of the first base station and a third timing offset of the third base station, and wherein the estimation of the second timing offset difference is based on the second UTDOA time difference and the second measured OTDOA time difference.

10. The first network node according to claim 9, wherein the estimation unit is further configured to estimate the second timing offset difference as one half of the difference between the second measured OTDOA time difference and the second UTDOA time difference.

11. The first network node according to claim 7, further comprising a positioning unit, configured to estimate a position of the user equipment based on at least one of the estimated first timing offset difference and the estimated second timing offset difference.

12. The first network node according to claim 7, further comprising a synchronization unit, configured to synchronize at least two of the first base station, the second base station, and the third base station, based on at least one of the estimated first timing offset difference and the estimated second timing offset difference.

* * * * *